(12) United States Patent
Selfe et al.

(10) Patent No.: US 9,830,808 B2
(45) Date of Patent: Nov. 28, 2017

(54) CONTROLLERS WITH ADAPTABLE INTERFACES

(71) Applicant: Logitech Europe S.A., Lausanne (CH)

(72) Inventors: Gareth Selfe, Newark, CA (US);
Christopher Coley, Newark, CA (US);
Oliver Hoheisel, Newark, CA (US);
Matthew Dickinson, Newark, CA (US);
Stephen Wheeler, Ottawa (CA); John Craig Robert DeGruchy, Newark, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

(21) Appl. No.: 14/853,509

(22) Filed: Sep. 14, 2015

(65) Prior Publication Data

US 2016/0104371 A1 Apr. 14, 2016

Related U.S. Application Data

(60) Provisional application No. 62/050,063, filed on Sep. 12, 2014.

(51) Int. Cl.
*G08C 17/02* (2006.01)
*H04L 12/28* (2006.01)

(52) U.S. Cl.
CPC .......... *G08C 17/02* (2013.01); *H04L 12/2818* (2013.01); *G08C 2201/20* (2013.01); *G08C 2201/30* (2013.01); *G08C 2201/92* (2013.01)

(58) Field of Classification Search
CPC .... G08C 17/02; G08C 23/04; G08C 2201/20; G08C 2201/30; H04L 12/2818
See application file for complete search history.

(56) References Cited

U.S. PATENT DOCUMENTS

| 7,296,917 | B1* | 11/2007 | Chiu | B60Q 1/245 340/12.5 |
|---|---|---|---|---|
| 8,558,716 | B2* | 10/2013 | Roberts | G08C 17/02 340/12.22 |
| 2014/0240104 | A1* | 8/2014 | Arling | G06F 17/30477 340/12.28 |
| 2016/0037332 | A1* | 2/2016 | Egeler | H04W 4/02 455/420 |

* cited by examiner

*Primary Examiner* — Nabil Syed
(74) *Attorney, Agent, or Firm* — Kilpatrick Townsend & Stockton LLP (57) ABSTRACT

Systems and methods for updating a control device may include receiving identifying information about an appliance, receiving identifying information about a component of the appliance, and sending a query to a remote server including information about the appliance and the component. The remote server may provide a response including configuration information for the control device, with a command for the appliance and a command that is specific to the component. A first input of the control device may be mapped to the command for the appliance, and a second input of the control device may be mapped to the command that is specific to the component, etc. When the second input is received, a command that is specific to the component may be generated.

26 Claims, 5 Drawing Sheets

CONTROLLERS WITH ADAPTABLE INTERFACES

BACKGROUND OF THE INVENTION

Remote control devices have enhanced users' ability to interact with their appliances for many years. Typical remote control devices are utilized to operate various external electronic devices including, but not limited to, televisions, stereos, receivers, VCRs, DVD players, CD players, amplifiers, equalizers, tape players, cable units, lighting, window shades, and other electronic devices.

Because of the multiple electronic devices currently available within many homes and businesses today, some remote controls allow for the control of a plurality of electronic devices commonly referred to as a "universal remote control." Many universal remote controls have "selector buttons" that are associated with the specific electronic device to be controlled by the remote control (e.g., television, VCR; DVD player, etc.). Universal remote control devices allow for the control of a plurality of external electronic devices with a single remote control, thereby eliminating the need to have a plurality of remote controls physically present within a room. However, many universal remote controls fail to work well for the myriad purposes that they are capable of, and merely result in a device that is cumbersome and not intuitive.

In addition, remote controls often control appliances using infrared (IR), radio frequency (RF), and/or other types of signals that are invisible to the human eye. As a result, it is often difficult for a user to tell whether a remote control is transmitting a signal at any given time. While some remote controls include features to alert users when a signal is being transmitted, such as flashing light emitting diodes and/or icons, such features are typically primitive, providing a user only rudimentary knowledge of what his/her remote control is doing.

While conventional remote controls may be suitable for the particular purpose to which they are addressed, from the perspectives of cost, ease of use, and expandability, they are not optimal, particularly considering the rapidly expanding range of home appliances that are capable or being remotely controlled, and the desirability to expand remote control functions to appliances that do not inherently include remote control capability. Accordingly, there exist ongoing needs to provide remote control systems that can be applied to one or more devices in a more intuitive and expandable manner.

SUMMARY

The present subject matter is directed to, among other objects, systems and methods for updating a controller and controlling associated appliances based on configuration information that is provided based on capabilities of the appliances. In some examples, the controller may be configured to detect devices and/or components (e.g. lamps, certain bulbs, locks, etc.) and obtain information or controller configurations that are specific to capabilities of the devices and/or components.

According to first aspects of the invention, methods for updating a control device may include one or more steps of receiving identifying information about an appliance; receiving identifying information about a component of the appliance; sending a query to a remote server including information about the appliance and the component; receiving a response from the remote server including configuration information for the control device, the configuration information including a command for the appliance and a command that is specific to the component; mapping a first input of the control device to the command for the appliance; mapping a second input of the control device to the command that is specific to the component; receiving the second input; and/or in response to receiving the second input, sending the command that is specific to the component.

Embodiments may include storing state data about a state of the component on the control device, and updating the state data after sending the command that is specific to the component.

In embodiments the appliance may be a lamp (or other appliance with replaceable parts) and the component may be a light bulb (or other replaceable part).

In embodiments the command for the appliance may be mapped to at least one of a hard button, a soft button, or a touchscreen icon, and the command that is specific to the component may be mapped to at least one of a hard button, a soft button, or a touchscreen icon.

In embodiments the control device may be at least one of a universal remote control, a smartphone, or a tablet computer.

Embodiments may include associating in a memory of the control device another appliance that includes the same type of component with at least one of the command for the appliance or the command that is specific to the component.

Embodiments may include displaying a query to the user regarding possible components that the appliance may include, wherein receiving the identifying information about the component of the appliance is received in response to the query.

In embodiments the response from the remote server may include commands that are adapted to match available controls of the control device.

In embodiments at least one of the command for the appliance or the command that is specific to the component may be mapped to a specific control on the control device based at least in part on a user preference.

In embodiments the user preference may be provided to the remote server, and content of the response from the remote server may be based at least in part on the user preference.

According to further aspects of the invention, methods for updating a control device may include one or more steps of receiving, at a server that is remote from the control device, identifying information about an appliance; obtaining information about a capability of the appliance; obtaining information about the control device; sending a response from the server including configuration information for the control device, the configuration information including a command for the appliance and mapping instructions for the command that are based at least in part on the information about a capability of the appliance and the information about the control device.

Embodiments may include receiving, at the server, identifying information about a component of the appliance, and obtaining information about a capability of the component.

In embodiments the configuration information may include a command that is tailored to the component.

In embodiments the server may be configured to prepare responses to various control devices that have different controls, and the response from the server may include commands that are adapted to match available controls of the control device.

Embodiments may include generating a macro based on one or more of the activity, a selected media content source corresponding to the activity, the end-state data, and/or current state data of the one or more appliances.

Embodiments may include obtaining a device inventory for a user of the control device, obtaining a user interface design parameter for the user, and/or generating a user interface for the control device based on the device inventory and the design parameter.

Embodiments may include one or more of receiving a user selection indicating a content source, obtaining macro data based on the content source, and/or generating a macro based on the obtained macro data.

According to further aspects of the invention, controllers (e.g. remote controls, smartphones, tablet computers and the like) may be configured to perform automated processes such as those mentioned above, and described further herein. Embodiments may also include non-transitory computer-readable storage medium including computer-executable instructions for configuring one or more processors to perform such automated processes.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

Various embodiments in accordance with the present disclosure will be described with reference to the drawings, in which.

DETAILED DESCRIPTION OF THE INVENTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
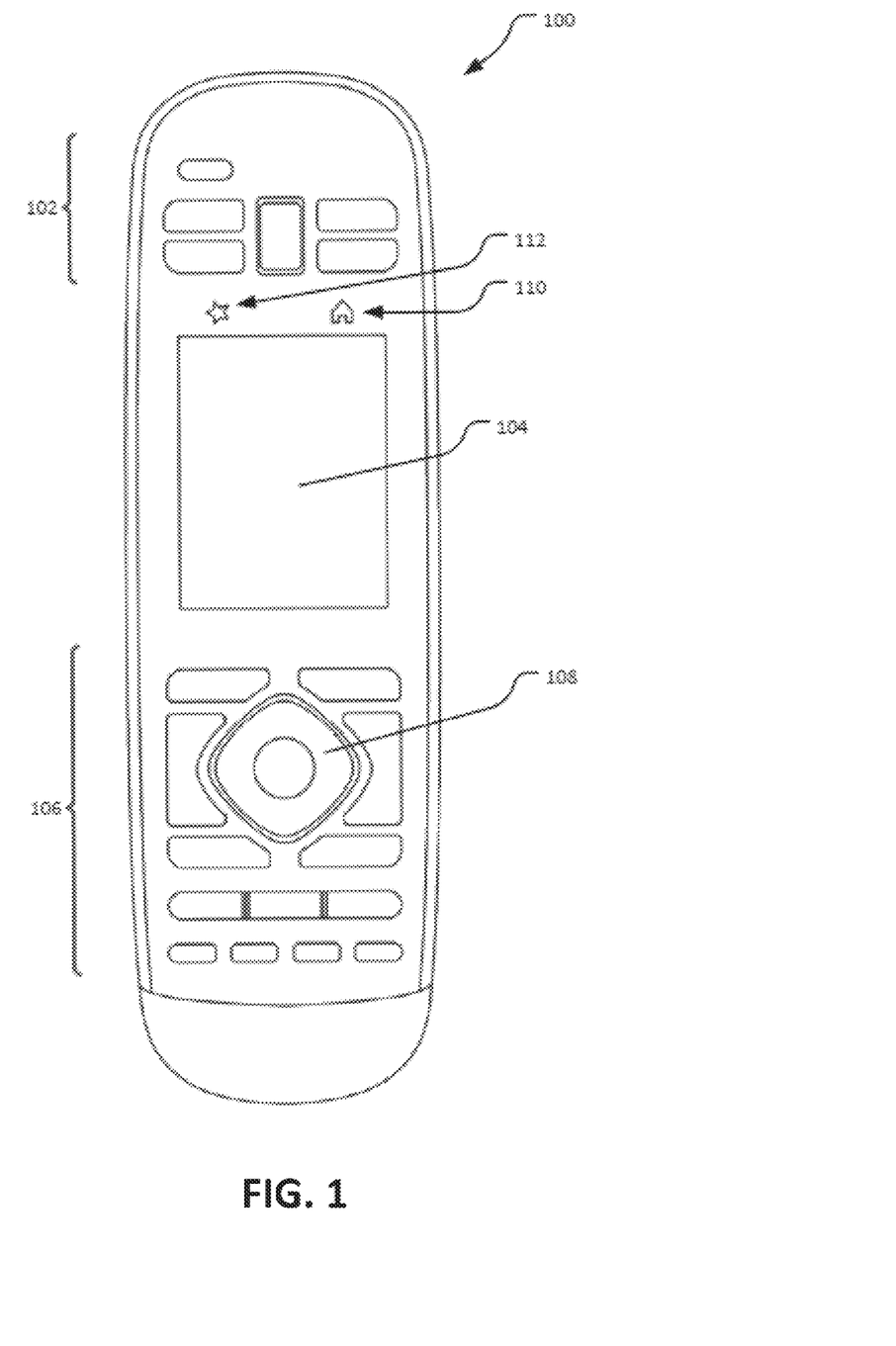
FIG. 1 shows an illustrative example of a remote control in accordance with at least one embodiment.

FIG. 1 shows an illustrative example of a remote control 100, also referred to as a remote controller, in accordance with an embodiment. The remote control 100 in this example has user input mechanisms allocated among three regions: an upper region, a middle region, and a lower region. The upper region, indicated in the drawing as 102, in an embodiment, includes a plurality of buttons used for the purpose of providing user input into the remote control. The buttons may be used for various purposes and numerous configurations are considered as being within the scope of the present disclosure. For example, the buttons in the upper region 102, in an embodiment, may be buttons determined to be the most commonly used by users of remote controls. Example buttons include a play button, a pause button, a record button, a fast forward button, and a rewind button, although numerous other types of buttons may also be in the upper region 102 instead of or in addition to the buttons mentioned. In an embodiment, the buttons in the upper region are mechanical buttons that operate by flipping an electronic switch when displaced. While such buttons are used for the purpose of illustration, numerous other types of buttons and/or other types of user input devices may be used in accordance with the various embodiments. For instance, user input devices may be virtual buttons, such as buttons displayed on a touchscreen and selectable by touching or otherwise interacting with the touchscreen. As another example, buttons may not be displaceable, but may be printed on or in connection with a touch-sensitive surface such that, by touching or otherwise interacting with the surface, the buttons may be selected.

When a user presses one of the buttons in the upper region 102, in an embodiment, the button activates a switch on a circuit located inside of the remote control 100, thereby causing one or more signals to be transmitted to a processor of the circuit which directs other portions of the circuit to act accordingly. For example, when a user presses a button on the remote control, a processor in the remote control 100 may cause a sub-circuit to transmit one or more signals corresponding to the button that was pressed. The signals may be transmitted in any suitable manner. For example, the remote control may include an infrared (IR) circuit that transmits IR signals, which are commonly used to control various appliances such as televisions, DVD players, Blu-Ray players, gaming consoles, receivers and other appliances. As another example, the circuit of the remote control may transmit radio frequency (RF) signals to appliances that are able to process such signals. As yet another example, wireless signals may be transmitted to a Wi-Fi receiver which may then, upon receipt of the signals, transmit signals over one or more networks, such as a home network and/or the Internet. For instance, in some examples, Wi-Fi signals may be sent from the remote control to a Wi-Fi receiver, which then, over copper wire, may transmit a signal to another device that reformats the signal into a different type of signal such as IR or RF. Generally, the remote control may transmit signals according to any suitable communication protocol or combination of protocols including those not explicitly mentioned herein.

In the middle portion of the remote control, in an embodiment, is a touchscreen 104. In an embodiment, the touchscreen 104 is a capacitive touchscreen configured to enable users to provide input to the remote control by moving a finger and/or other appendage in contact with and relative to the touchscreen 104. While a capacitive touchscreen is used for the purpose of illustration, any touchscreen or touch-sensitive surface suitable for use in various embodiments described herein may be used. In addition, while touchscreens are used for the purpose of illustration, techniques described herein may be adapted to other user input devices, such as input devices utilizing proximity sensing. For instance, techniques described below are discussed in connection with users interacting with a touchscreen with an appendage (or other object) in contact with the touchscreen. Such techniques may be adapted so that similar gestures may be input without touching the input device by, for example, moving the appendage (or other object) in some specified way in proximity to, but not in contact with, the input device.

Other techniques for navigating a touchscreen, such as techniques used in smartphones, tablet computing devices, and other devices, may also be used in a remote control. For instance, for some states of a GUI, a user may navigate through the GUI states by sliding a finger along the touchscreen in a direction corresponding to the navigation, as if the finger is sliding one page out of the way to be replaced by another page. As another example, a user may touch the touchscreen with two fingers and separate the two fingers while in contact with the touchscreen to cause a zoom function to change how the GUI appears. Other techniques may also be used. Indeed, embodiments of the present disclosure include embodiments where an application on a smartphone, tablet computing device, or other device is configured for control of one or more appliances, either by directly transmitting signals to appliances and/or indirectly, such as by transmitting one type of signal to a bridge device that itself transmits a corresponding signal to the appliance(s).

However, embodiments using remote controls whose primary purpose is the direct or indirect control of appliances are particularly useful in numerous circumstances. For example, such handheld remote controls may be physically configured advantageously to provide numerous advantages. For example, as illustrated in FIG. 1, the remote control 100 is configured such that both the buttons in the third region 106 and the touchscreen 104 are within easy reach of the thumbs of typically-sized hands when a user grips the remote control 100 in a natural fashion, that is, how users typically grip remote controls. A natural grip on the remote control 100 may also be reinforced by contours on the side and/or bottom of the remote control 100, although such contours are not shown in the figure. Further, in this example, the buttons in the third region 106 are tactile, thereby making it easier for the user to control appliances without having to look at the remote control, yet the touchscreen provides additional context-sensitive flexibility, such as described herein. As yet another advantage, such handheld remote controls may be optimized to communicate to/with appliances using protocols (line of sight IR, RF, e.g.) that are common for use in appliance controls. Smartphones, tablets, and the like may not include such optimization because their primary use is communication using other protocols, such as Wi-Fi and cellular protocols. In addition, smartphones, tablets, and the like may require additional bridge devices that enable communication with appliances whereas many remote controls in accordance with various embodiments are configured to communicate to/with appliances without the need for a bridge device (although the use of a bridge device is considered as being within the scope of the present disclosure).

The remote control 100, in an embodiment, includes a lower section 106 that includes other buttons which may be used to operate the remote control 100. Buttons of the lower section 106 may be buttons different from those in the upper section 102, although some buttons may be the same. Buttons in the lower section may, as with the buttons in the upper section, be used to provide user input into the remote control to cause the remote control to operate accordingly. For example, buttons of the lower section may include buttons for channel up commands, channel down commands, volume up commands, volume down commands, and generally any other buttons such as buttons available on conventional remote controls. In addition, the lower region 106 of the remote control 100, in an embodiment, includes a five-way key 108 which may be used, for example, to navigate a GUI presented by an appliance. For example, in many instances, a television displays a graphical user interface of the television or of another appliance such as a DVD player. The five-way key may be used to navigate by moving a cursor or other graphical user interface element up, down, left or right in the GUI. A button in the center of the five-way key 108 may be used to make selections of elements in the GUI presented by the appliance, such as selection of currently highlighted elements.

In an embodiment, the remote control 100 includes additional buttons which, unlike the buttons of the upper region and lower region in the illustrative example of FIG. 1, are not mechanical buttons. For example, as illustrated in FIG. 1, just above the touchscreen 104 appears a home button 110. The home button 110 may be selectable by a user of the remote control 100 in order to cause a GUI of the remote control 100 to navigate to a screen designated in memory of the remote control as a home screen. Thus, a user may touch the home button 110 in order to cause the home screen to appear on the touchscreen 104. In this manner, a user may navigate quickly and easily to a familiar screen without having to, for example, hit a back button numerous times and/or otherwise navigate to such a screen. Similarly, the remote control 100, in an embodiment, just above the touchscreen 104, includes a star button 112. The star button 112, in an embodiment, as with the home button 110, is not a mechanical button, but is simply operated by touching the remote control 100 at the location where the star button is located.

Selection of the star button 112, in an embodiment, causes representations of one or more content sources to be displayed on the touchscreen 104. The representations of the content sources may, for instance, be icons representing favorite channels of a user of the remote control 100. Content sources may also correspond to other types of content. For instance, selection of the star button may cause, among other things, an icon representing a television series accessible through an on-line video streaming service such as Netflix to appear. Selection of such an icon may then cause the remote control to transmit one or more signals so that a set of appliances of the user changes state in order to enable the user to watch the content corresponding to the icon. For instance, if a television of the user includes an application that allows video streaming through a video streaming service, selection of an icon representing content of the video streaming service may cause the remote control to transmit signals that cause the television to change state such that the content is displayed on the television. Similarly, other devices, such as content streaming devices separate from televisions may be caused to change state appropriately in response to user selection of a content source. In some embodiments, selectable content sources include sources that are not necessarily sources of pre-recorded multimedia content. For example, a content source may correspond to a user of an Internet-based telephone service, such as Skype. A user may, for instance, select one or more of his/her contacts and, as a result, the remote control may cause a device with a telephone service application to place a call to the selected individual(s). In one embodiment, a system of one or more appliances would be configured to first properly make such a call, and/or would ensure/confirm that that system was in the right configuration, such as by prompting a user for user input requesting such a configuration, perhaps by asking the user if he/she would like to call a particular person and accepting user input corresponding to yes or no. As another example, a content source selectable after selection of the star icon may correspond to a telephone number of a person. The remote control may cause a telephone device, such as a controllable voice over Internet protocol (VOIP) device, to dial the telephone number corresponding to the selection. Generally, the content source may be anything corresponding to content, which is not necessarily pre-recorded, that may be accessed by altering the state of a set of one or more appliances.

Further, content represented on a screen corresponding to the star button may be all of one type (e.g., broadcast TV), or may be from multiple types. For example, a favorites screen (corresponding to the star button) may show 3-broadcast network channels, Netflix, and Skype all on one screen. As an alternative, a GUI may group things together logically like all broadcast content sources on one screen, or all sports related content sources on one screen. Favorite sources of content may be pre-assigned by the user, or may be dynamically created based on analysis of use. (E.g., most frequently accessed content would become favorites automatically, in some embodiments.) Further, as with assignment of favorites, logical groupings may be done by a user and/or by the remote control (or, generally a remote control system) based on monitoring and some information obtained about the content/subject matter associated with the link/activity. For instance, the remote control (or a remote control system) may create links to the CNN TV channel and the ESPN website, that is, selectable GUI elements for causing appliances to provide content from the CNN TV channel and the ESPN website, respectively. In addition, logical groupings of content sources on a screen may also be used. In this manner, broadcast channels may appear together as may Skype contacts.

In an embodiment, the home button 110 and the star button 112 are selectable via the touchscreen 104. For instance, the touchscreen 104 is represented by a rectangular box in FIG. 1, which may be viewable area of a display of a touchscreen 104, that is, an area in which the touchscreen displays an interface and such display of the interface is visible to a user of the remote control. The touch sensitive portion of the touchscreen 104 may, however, extend underneath an opaque portion of a housing of the remote control 100 to the areas occupied by the home button 110 and the star button 112. Thus, selection of the home button 110 and the star button 112 may cause user input to be provided to the remote control 100 through the touchscreen 104, even though the home button 110 and the star button 112 are not located in an area of the touchscreen 104's visible display. The touchscreen's display, however, may be used to illuminate the home button, star button, and/or other buttons by shining light through a portion of the housing of the remote control.

It should also be noted that a display area of the screen shown in FIG. 1 and in other figures herein are illustrative in nature and the screens may display different and/or other information. For example, a display screen may show what mode the remote control is in, may show a battery level, may show a time and/or date, and generally any information may be shown on the screen.

Figure 2:
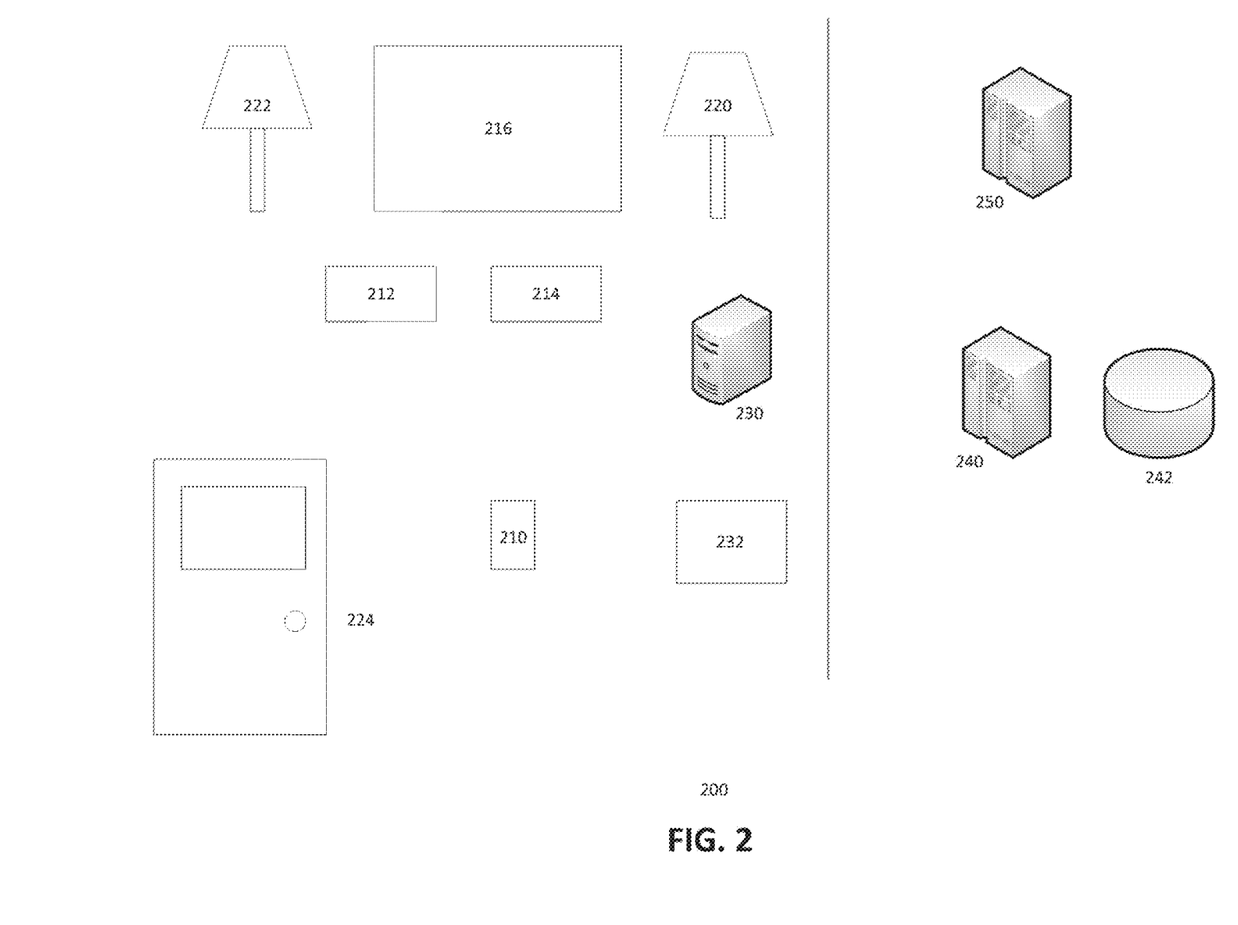
FIG. 2 shows an illustrative example of an environment that may be used to configure remote controls in accordance with at least one embodiment.

An exemplary environment 200 showing multiple devices is shown in FIG. 2. Control device 210 may be any type of control and/or computing device discussed herein, and may be in communication with any of A/V appliance 212, A/V appliance 214, window system 216, lamps 220 & 222, door lock/alarm 224, home computer 230, router/blaster 232, or any other device. In some examples, the appliances shown in FIG. 2 each have their own communication capability that can interact with the control device 210 and/or router/blaster 232. However, in other examples, the control device 210 may communicate with a hub that controls power or other functions related to specific devices. For example, a smart hub may be configured to toggle and/or adjust electrical power to or from a given outlet in order to turn an appliance on, turn the appliance off, or adjust the appliance (e.g., dimmer, fan speed, etc.). In embodiments, the control device 210 may be configured to detect appliances and/or components (e.g. lamps, certain bulbs, locks, etc.) and store a record of the appliances and/or components. In some examples, the record may include an association between the appliance(s) and the component(s) that are included in the appliance(s), or vice versa.

In some examples, the control device 210 may be configured to query a server 240 with database 242 for identification of appliances and/or component capabilities, and generate an interface for one or more functions associated with the capabilities. In some examples, the interface may have a similar appearance and/or functionality (e.g. standardized) for devices of the same type or sharing similar capabilities. For example, lamps 220, 222 may share common capabilities and may be assigned a common interface with similar command mappings. In some examples, different devices with the same capabilities may be associated and controls for the different devices may be linked by the controller. For example, A/V appliances 212, 214 may share one or more common command that may advantageously be mapped to a similar command on control device 210. By determining the capabilities of the appliance themselves, the overall system (e.g. at the controller, home hub/PC, and/or server level) may generate associations that may not otherwise be apparent. For example, different device types In some examples, the control device 210 may be configured to obtain and/or analyze device capabilities, e.g. from centralized, remotely-accessible database 242), and one or more of identify APIs, categorize the capabilities, and/or map capabilities to functions (e.g. related to the capabilities) and/or controls (e.g. of the controller). Systems, including the control device 210, home hub/PC 230, and/or server 240, may be configured to present a tailored interface on the control device 210 based on the type of controller and/or based on controls that the controller has. For example, the system may recognize that a certain controller has (or does not have) a touch screen, certain hard buttons, a certain number of soft buttons, etc. Therefore, tailored interfaces can be generated for a give control device 210 based on the available controls. In some examples, database 242 (or a data file on device 210, and/or local computer 230) may have records that associate and/or categorize certain controllers with appropriate interfaces.

Systems may also be configured to consider the appliance type and capabilities (e.g. dimmer, light hue, types of locks and/or alarms, etc.) in generating and/or selecting the appropriate interface. This consideration may include algorithms that prioritize and/or associate certain device capabilities, functions and/or commands, with certain controller and/or control types. Such algorithms can apply varying levels complexity. For example, a matching algorithm may strongly associate a "volume" capability for a device with a volume hard button on a certain remote, and may also be configured to strongly associate a "dimmer" (or any other)

command with the same volume hard button (e.g. based on the "up" and "down" buttons adequately fulfilling the dimmer command function. However, the algorithm may be configured to have varying levels of association, and may, for example, prioritize a "slider" touch screen or surface to map the dimmer function to, if available.

Systems may be configured to allow the user to manually set and/or weight the control(s) that they want to associate with certain functions. For example, the user can prioritize that volume hard buttons (or any other type of command interface) be assigned to dimmer (or any other functions). The user can further specify the type of device(s) that they want the preference to apply to. In some examples, the system (e.g. at the control device 210, the hub/PC 230 and/or server 240) may be configured to automatically adjust a selection algorithm based on user selection(s) and/or assignments of similar functions and commands.

In some examples, a control device 210 may be configured to automatically "bundle" (e.g. to associate) similar devices and/or capabilities. For example, a number of smart lamps, or lamps connected to smart hubs, may be detected or otherwise learned by the controller, and the controller may automatically associate the smart lamps and/or lamps connected to a smart hub in various ways. One association may be to send the same commands to the associated devices. Another type of association may display icons for all of the associated devices on the same command screen.

In some examples, the system may be configured to associate different types of capabilities with a common function. For example, a user may want to implement a "dimming" function that may link actual dimming and/or "off" commands for lighting devices 220, 222, along with "close" or "down" commands for automated shades of window system 216. In some examples, such commands can be bundled to the same soft or hard button (or other control) of a control device 210, such that activation of the one button (or other control) simultaneously activates light dimming and shade closing functions.

In some examples, the system may support multiple control platforms, e.g. universal remote controls, cell phones, tablets, remotes with a touch surface, remotes without a touch surface, remotes with a screen, remote without a screen, etc. The local hub/PC 230 and/or server 240 may be configured to select and/or generate control configurations based on categories of controller, or by identifying specific controller.

In some examples, the control device 210 may be configured to retrieve configurations from remote server 240. The configurations may be downloaded by and/or stored on a controller hub/PC 230, e.g. in a user's home. It should be appreciated that, although some examples are described in the context of appliances that are configured to be remotely controlled (e.g. using IR, RF, over wire, or other communication) the invention is not limited to the control of such appliances, and may, for example, be used to configure and control appliances that are not inherently remotely controllable. This can include, for example, the use of smart hubs, or other technologies, that allow for power activation, deactivation and/or adjustment to "dumb" appliances, or other forms of control.

In some examples, the system may be configured to obtain permissions to control a particular device from a $3^{rd}$ party vendor, such as via a vendor server 250, and/or may provide commands to a $3^{rd}$ party vendor to control particular device(s). For example, certain locks and/or alarms like lock/alarm 224, may require passcodes or other interaction with a $3^{rd}$ party vendor, e.g. for remote unlocking, alarm activation/deactivation, etc. Control device 210 may be configured to obtain such information from remote server 250 and or to request appropriate action be taken by remote vendor 250, as necessary.

Exemplary systems may be configured to support devices and components that pair automatically with the system (i.e. without specific permissions), as well as those that require permissions (e.g. from a $3^{rd}$ party) and/or those that require manual or semi-manual configuration. In examples, the system may present any necessary requests to the user, e.g. on a controller screen or the screen of a device being controller. Such requests may include, for example, requests for user information, requests for user account information, requests for passwords associated with a user, requests for passwords associated with a user account, requests for device information, etc.

According to aspects of the invention, the command configurations of the control device 210 can be routinely tuned to ensure that specific appliances and old or new components, are fully controllable. For example, capabilities, multiple information exchange protocols, and/or 3rd party control interaction (such as function upgrades, locks, etc.) can be updated via remote server 240 recognizing that control device 210 or hub/PC has a certain controller configuration, and sending updates, as needed.

Figure 3:
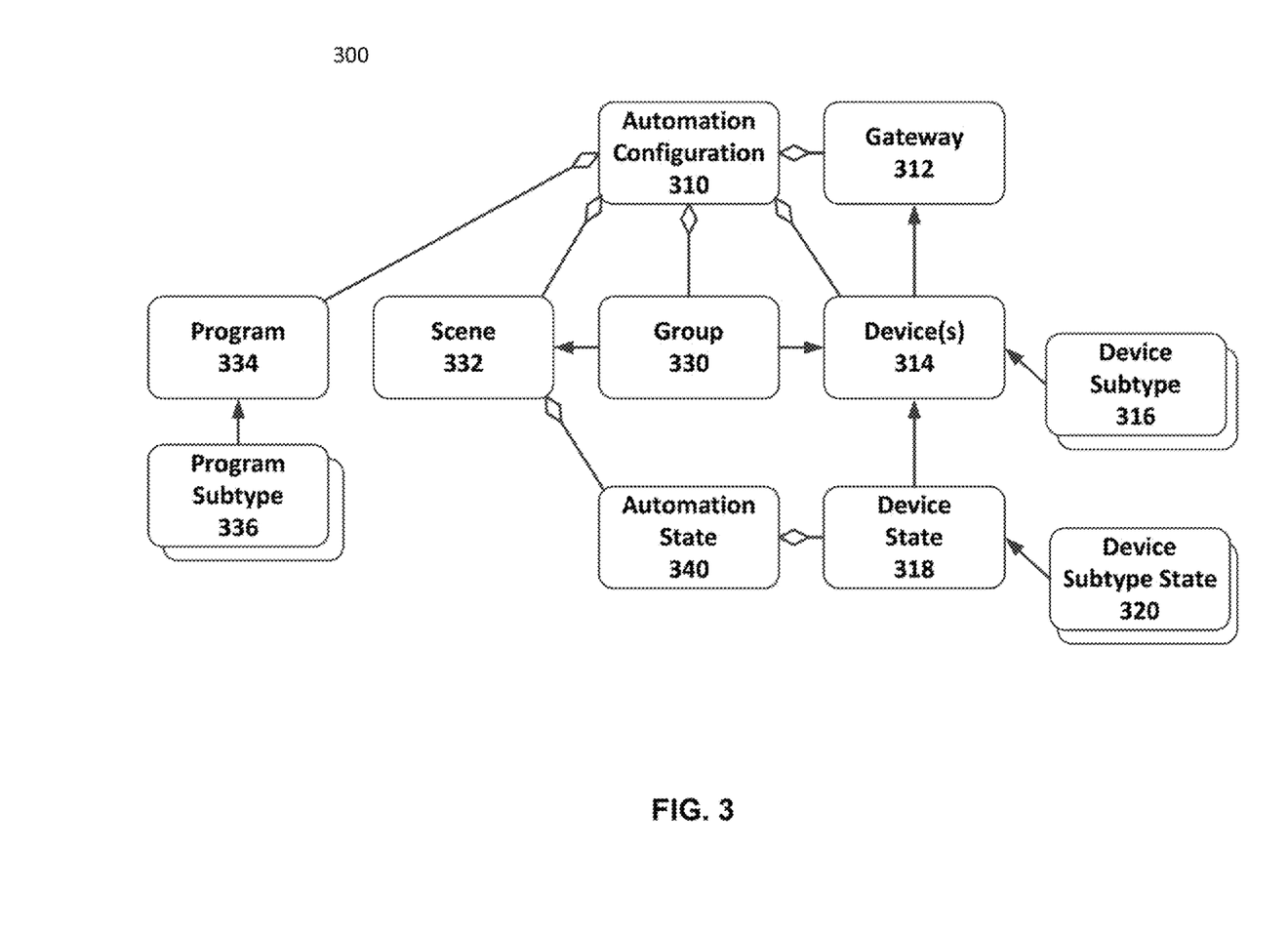
FIG. 3 shows a high-level schematic related to configuring remote controls in accordance with at least one embodiment.

FIG. 3 is a schematic environmental diagram showing exemplary nodal relationships between an automation configuration utility 310, a gateway 312, device(s) 314, device subtypes 316, device state 318, device subtype state 320, among others. A shown in FIG. 3, an automation configuration utility 310 may exchange information with a variety devices, services, etc., through a gateway 312, which may represent any type of communication link, or in some examples a computerized system that is configured to support automation configuration of a control device in cooperation with a server-based system. Automation configuration utility 310 may act as a container for all config data related to home automation. These may include, for example:

| Field | Type | Description |
| --- | --- | --- |
| id | string | Unique identifier. |
| account_uri | string | URI of the account with which this config is related. |
| gateways | sting -> Gateway | Map of unique string ID's to Gateway objects. Hub will ad unique uuid for newly discovered gateways. |
| devices | string -> Device | Map of unique string ID's to Device objects. Every device in this list will reference an automation gateway within the gateways map. |
| groups | string -> Group | Map of unique string ID's to Group objects. |
| scenes | string -> Scene | Map of unique string ID's to Scene objects. |
| programs | string -> Program | Map of unique string ID's to Program objects. |
| maps | string -> Map | Map of string ID's to Map objects |

Gateway 312 is linked to one or more device 314, which may be a device that is to be controlled. Gateway 312 may represent a home automation gateway, either a physical device on the local network or an online service gateway. The exact set of fields present depends upon the type of gateway. That is, using a field "type," the type of gateway may determine which other fields are present in gateway records. The gateway type may also be used to determine which code modules are used, for example, in UI rendering of device states and controls, and/or discovery, pairing and communicate with the gateway. In some examples, the gateway 312 may include a proprietary protocol for a specific vendor (or protocols including industry standards and/or open source) that provides support to the gateway, e.g. Logitech Harmony remotes, icontrol security programs, nest thermostat, etc. Accordingly, the type can be used to set fields, values, ranges, parameters, etc. for device records. For example, optional fields may include name, status, identifier(s), communication link, password, etc., any of which may be implemented or configured depending on the designated device type.

A device 314 may represents, for example, a single home automation device, and may further include any number of device subtypes 316, which may represent certain capabilities and/or components associated with the device 314. For example, in some cases a device subtype 316 may represent a capability and/or option that is specific to a model of the device 314, and which may be determined in various ways such as by accessing information from the device 314, from a component of the device 314, by user input, by accessing a remote database with device and/or component information, etc. It should be appreciated that nodes 312, 314, and/or 316 may be records for the automation configuration 310, e.g. representing actual devices.

Records for device(s) 314 may include a type field, which may be, for example, lamps, thermostats, alarms, locks, sensors, fans, blinds, power plugs, appliances, or virtually any other controllable device. The record may also include a gateway identifier for the type of gateway 312 that is used to control the device, and/or a specific gateway identifier, which may identify the specific controller associated with a device in a multi-controller environment.

In some examples, the device type field (or other field(s)) may be used to determine which other fields are present in device records, as well as parameters associated with those fields. For example, for a device type "lamp" the following fields may be configured:

As can be seen, individual device parameters may include a variety of fields related to device capabilities, modes, configurations, state, components, etc. In some examples, predetermined configuration files for specific device types may have a plurality of fields that are set according to the capabilities of a specific device that is being configured for control. For example, a specific thermostat file may include the following fields set according to the device capabilities:

| Type | thermostat |
| --- | --- |
| gatewayId | 1111-1111-1111-0000000 |
| Manufacturer | ZZZZZ |
| Model | ZZZZZ 1.0 |
| gatewaydeviceId | 1234-1234-5678-999999 |
| name | "Hallway Thermostat" |
| Commlink/pword | Homenetwork |
| | 123456 |
| capabilities | auto: true |
| | cool: true |
| | heat: true |
| | auxHeat: true |
| | fan: true |
| | fanOff: false |
| | hold: true |
| | schedule: false |
| | light: false |

As can be seen above, for the specific thermostat, there are some capabilities that may be set based on the identifying information, such as "cool" or "heat" functions that are associated with the thermostat make and model, or other like "schedule" that are not supported, as well as some that may be determined based on monitoring the device, such as "light" which may be malfunctioning, etc. Myriad other capabilities may be reported based on device capabilities, self-monitoring, and/or components. Battery state, temperature, dimming capability, password reset, and any other capability may be mapped. These may be determined, for example, by querying the device directly, analyzing local records, and/or sending requests to a remote service for

| Name | Type | Notes |
| --- | --- | --- |
| type | string | type is always "lamp" |
| gatewayId | string | ID of the gateway within the automation config |
| manufacturer | string | Lamp manufacturer (optional) |
| model | string | Lamp model (optional) |
| gatewayDeviceId | string | Unique ID of the lamp |
| name | string | Lamp Name |
| notiLat | int | Notification latency in seconds |
| | | 0: device does not provide a notification (cannot be used to trigger programs) |
| capabilites.class | string | Describes the class of the lamp: |
| | | "bulb": lightbulb |
| | | "plug": plug-in module |
| | | "switch": switch, typically mounted in-wall |
| | | "outlet": power outlet typically mounted in-wall |
| | | nil or "": class is unknown |
| | | Note: This is purely descriptive, do not assume any capabilities stemming from the class. The main use of class is to show an appropriate icon. |
| capabilities.dimUpDown | bool | Supports brightness with up/down commands |
| capabilities.dimLevel | bool | Supports brightness with an integer level parameter |
| capabilities.temp | bool | Supports color temperature |
| capabilities.hueSat | bool | Supports color hue, saturation |
| capabilities.xy | bool | Supports color CIE x, y |
| capabilities.battery | bool | can report the state of its battery |
| capabilities.edit | int | 0 or nil: device cannot be deleted, name cannot be edited |
| | | 1: device can be deleted, name cannot be edited |
| | | 2: device cannot be deleted, name can be edited |
| | | 3: device can be deleted, name can be edited | device and/or component information. The automation configuration utility may also receive and/or generate device and/or component-specific commands.

Node 318 represents one or more indicators of device state 318 for the device 314 and may include any number of device subtype states 320. For example, the state of various electronic devices may be represented by 318, such as on/off, up/down, level, tuning channel, source, locked/unlocked, etc. In some cases, the device subtype state 320 may represent a state that is specific to a component of the device 314, e.g. a power setting of a light, a lock/unlock indicator for a specific lock, etc. In some examples, either a complete description of the current state of a home automation device, and/or a declaration of the desired state to put the device into may be included in node 318. The fields present may depend upon both the type of gateway and type of device.

Scene 332 and group 330 represent nodes by which the automation configuration may classify, categorize, and/or present devices. For example, a plurality of devices may be grouped together based on a common function and/or location (e.g. lights in a given room), to perform a combined function, like "play movie," or to be presented in a common "scene" on a control device. Program 334 may include various control, GUI, or other programs configured to receive, transmit, or process various device, function or other commands such as those described herein. Program subtypes 336 may represent different types of programs that are recognized, available and/or implemented by the automation configuration utility 301, the recognition of which may be used to determine command configuration and implementation procedures as discussed further herein.

In some examples, auto groups may be identified, e.g. by auto flags set to true. They may be automatically added, updated or deleted to/from the AutomationConfig by the system. Functions for this may be provided in/automation/core/common.lua. For example, all plugins may call the helper functions whenever they add or remove a device to/from the config. Auto Groups may include: name "LIGHTS" all dimmable devices of type lamp; name "APPLIANCES" all nondimmable devices of type lamp; name "THERMOSTATS" all devices of type thermostat; name "LOCKS" all devices of type lock; name "SENSORS" all devices of type binary sensor; name "COVERINGS" all devices of type covering. The helper function may create the groups when the first device of the associated type is added. They may also delete a group if the last device of the associated type is removed.

Scene may 332 may represent a named set of preset states of devices. Not all devices being controlled need have their state specified within a scene. When a scene is set, devices with an unspecified state are unaffected. Examples may include processes for automatically setting scenes, e.g. based on state of similar device types. For example, a "bright" scene may be used to adjust all dimmable lamps (in a specified area or throughout a control network) with brightness below 100% up to 100%, or "dim" scene may be used to adjust all dimmable lamps to 60%. In some examples, all dimmable lamps in a specified area, subnetwork, gateway, or control network, may be added to such auto scenes.

In some examples, the automation configuration utility 310 may be separate from an automation state module 340. Although the automation configuration utility 310 may include representations of multiple or combined device states 318, e.g. within group 330 presets, it may not include the current state of any specific devices. Therefore, in some examples, current state of all automation devices is maintained separate as automation state module 340 from the automation configuration utility 340. Further details are provided with respect to FIG. 4A.

Figure 4A:
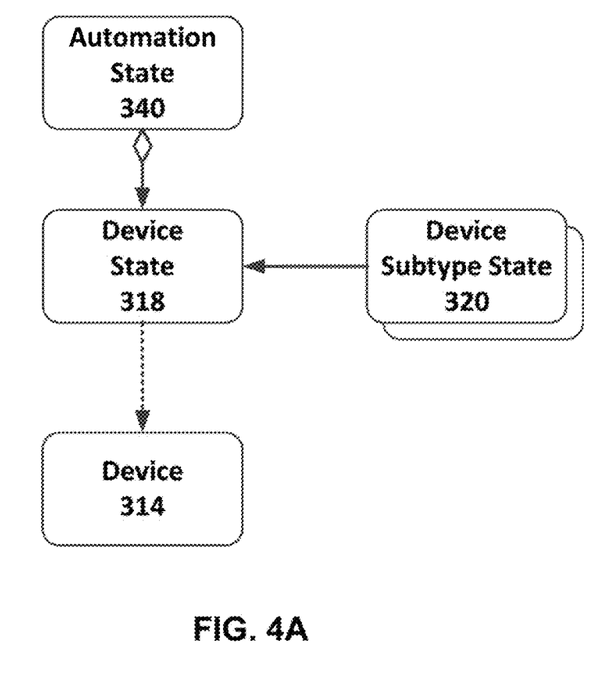
FIGS. 4A and 4B show additional high-level schematics related to configuring remote controls in accordance with at least one embodiment.

FIG. 4A is a schematic diagram showing node relationships between the automation state 340, device state 318, and device subtype state 320. As shown in FIG. 4A, the automation state 340 may acquire information regarding device state 318 and/or device subtype state 320 in order to maintain an up to date record of device state, including component state, which may be settings, functional status, expected lifetime remaining, etc. The device 314 may provide or receive information to/from node 318 in order to report or change state for any setting, component, etc.

Figure 4B:
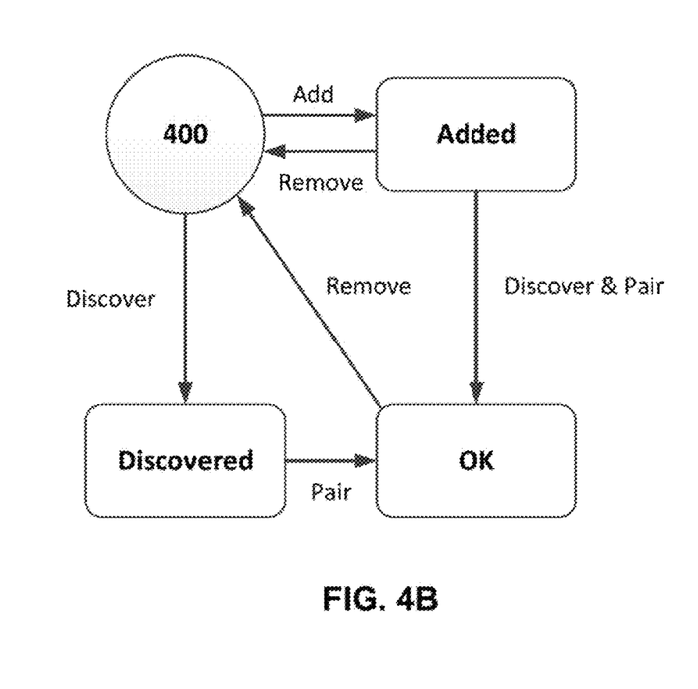
Figure 5:
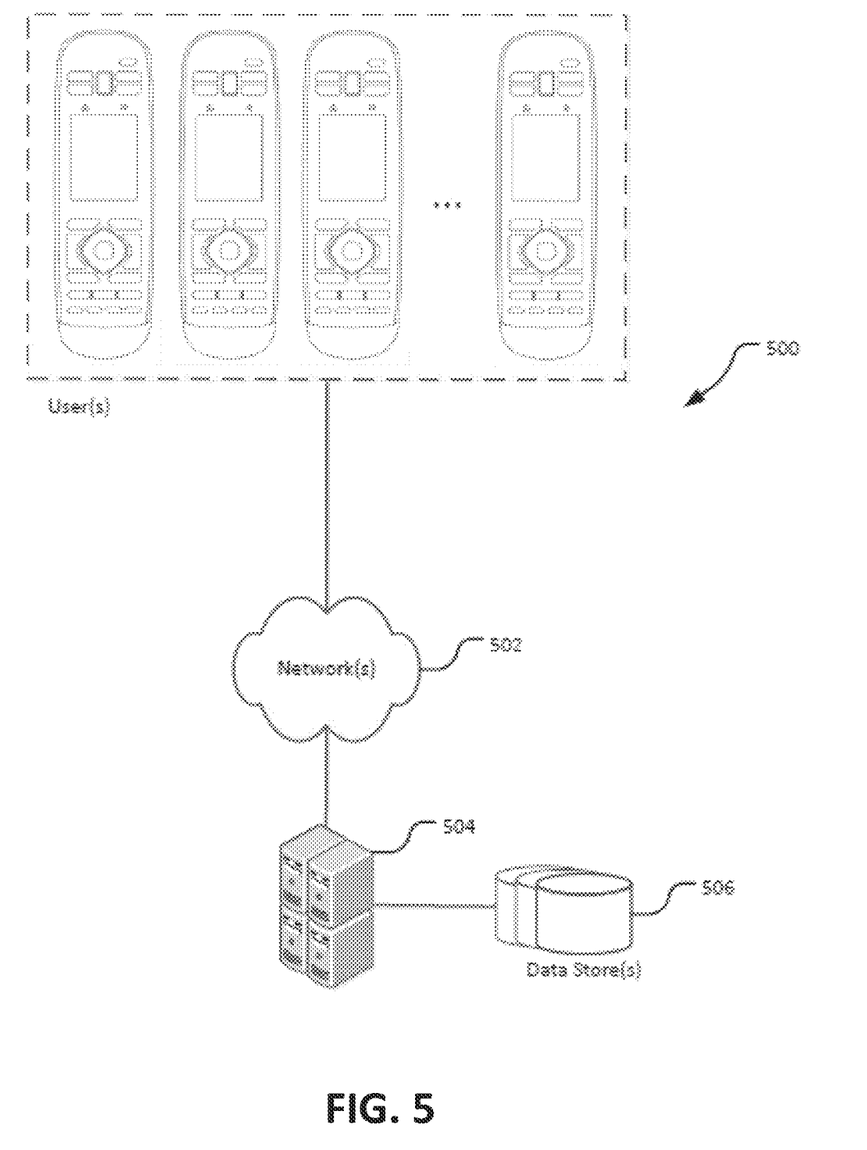
FIG. 5 shows an illustrative example of an environment that may be used to configure remote controls in accordance with at least one embodiment.

FIG. 4B is a schematic diagram showing node relationships for a gateway state transition, according to aspects of the invention. A gateway, such as 312 shown in FIG. 3, may be configured to discover, pair, add and/or remove devices Various embodiments of the present disclosure allow users to customize their remote controls according to their particular inventory of appliances. FIG. 5 therefore shows an illustrative example of an environment in which users may configure their remote controls. In an embodiment, remote controls are configured over one or more networks 502, which may be any suitable communication network or combination of networks, including, but not limited to, intranets, the Internet, mobile communication networks, and the like. In the example, users can configure their remote control by communication with a server or cluster of servers 504 that are configured to enable users to configure the remote controls according to users' particular inventory and preferences. For example, users may, through a web interface provided by the servers 504, input to the servers 504 information about his or her appliances and how those appliances are connected together and used for various activities such as watching TV, watching movies, and the like. The servers 504 may be operatively connected with one or more data stores 506 which have data for remote control configuration. For example, the data stores may include IR commands and libraries for various appliances as well as timing information for various commands and/or appliances (e.g., so that appropriate pauses between commands may be inserted into macros to allow appliances time to transition between states). For instance, if the user inputs that he or she has an appliance that uses IR, the data stores may be referenced by the servers 504 to obtain data that will enable configurations of the remote for transmission of signals acceptable by that appliance. Other data may also be stored by the data stores 506 such as user profiles, inventories of user appliances, specific user settings, and the like. The servers may include application servers that dynamically generate appropriate configuration data for remote controls based on user input provided by the users.

Information about the layout of the remote control may also be taken into consideration. For example, the display screen of the remote control may be configured to display representations for five commands (e.g., change input, aspect ratio, root menu, skip forward, skip back, etc.). Logic may be used to configure the list and layout of these commands for the remote control. For example, if a remote control has five slots for representations of commands on the screen (or on each page of a multi-page portion of the GUI), similar commands may be grouped together. For example, the skip forward and skip back command may appear on the same page in various embodiments. This may, for example, avoid a poor user experience if one of these functions were on one page, and the other on another page, as it would be common for these to be used together. For example, a "commercial skip" command used in connection with digital video recorders (DVRs) may cause a DVR to skip and/or fast forward an amount of time, such as thirty seconds. If the DVR went forward too far, the user may want to go back immediately. It would be inconvenient to have to change screens to do this.

Configuration data for the remote controls may be provided to the remote controls in any suitable manner. For example, in some embodiments, the remote controls are connected to personal computers (e.g., through a universal serial bus (USB) interface) that connect to the servers. The personal computers may be used by users to input information that is used by the servers to obtain appropriate configuration data. In some embodiments, however, the remote controls themselves have the ability to communicate over the network(s) 502 and connect to the servers themselves. As one example, the remote controls may be remote control applicants on smartphone or tablet computing devices that themselves have network communication technology. In such embodiments, users may input data to the servers through the remote controls. As another example, the remote controls themselves connect to servers to receive configuration data, but users input information to the servers through a UI provided on another device, such as a personal computer. Other variations are also considered as being within the scope of the present disclosure.

In an embodiment, methods may include receiving UI design parameters from the user. For instance, a web page or other interface may be presented to the user and the user may customize an interface for a remote control. Customizing the interface may be done in any suitable way and customization techniques vary among the various embodiments of the present disclosure. For example, users may select which icons appear and may configure various UI screens and the transitions between them and perform other manipulations in designing a UI customized for the user of a remote control. As another example, users may select UI screens and may select which gestures correspond with which commands in those screens.

Upon receiving the UI design parameters from the user and the device inventory, one or more maps of commands for UI screens, etc., based on UI design parameters and device inventory, may be generated. A map may be an electronically stored representation of associations among gestures, commands (or sets of commands), UI states (e.g., UI screens), and/or other information. The map may be used by a remote control to ensure that user input is interpreted correctly. In an embodiment, remote control configuration data is then generated based at least in part on the generated maps. Configuration data may be any data used to configure a remote control and the format and structure of configuration data may vary among the different embodiments. For example, configuration data may encode the UI screens themselves. As another example, configuration data may be data used to populate templates stored on a remote control for generating UI screens and for commanding appliances from those UI screens. Generally, the configuration data may be any data usable to configure a remote control, depending on a particular remote control's particular method of being configured.

The generated configuration data may then be transmitted to the remote control. Transmitting the configuration data may be performed in any suitable manner. For example, in some embodiments, the server transmits configuration to the remote control through a network to a personal computer of a user. The personal computer may then include an application, which may be a stand-alone application, browser plugin, or other suitable application that transmits the configuration data through an appropriate interface such as a universal serial bus (USB) interface or in any suitable manner, which may include wireless transmission of configuration data to the remote control over a wireless communication protocol, such as Bluetooth, Wi-Fi, and/or other protocol. Similarly, if a remote control has the ability to be configured with such abilities, the server may communicate directly with the remote control.

Various embodiments of the present disclosure also include tracking the state of various appliances and using that tracked state in order to more effectively control the appliances. In an embodiment, user input indicating selection of a content source is received and an activity based on the selection is then determined. An activity may be a logical representation of a mode of experiencing content that corresponds to appliances in a particular set of appliances being in a particular state. Such activities may be, for example, watching TV, watching a video streaming service, listening to an Internet radio streaming service, listening to music through a CD player, interacting with an Internet video calling application (Skype, e.g.), playing video games, interacting with an Internet browser, and the like.

In an embodiment, the process includes accessing end state data for the determined activity. In an embodiment, end state data is data that is indicative of the state of a set of one or more appliances suitable for the appliances to participate in the activity. For example, if a user watches television using a set top box to obtain broadcast channel data from a cable company, and uses a receiver to provide audio for watching TV, the end state data may indicate that the television should be turned on, the receiver should be turned on, and the set top box should be turned on, and each of those devices should be set in a particular manner. For example, a TV should be configured to obtain video data from the set top box by being set to a proper input, and likewise a receiver should be set to a setting that enables the receiver to receive audio data from a set top box. Volume and other settings may also be specifications for an activity. As another example, if an appliance includes an application for video calling service, the end state data may indicate that the application should be running, that the application should have authenticated itself with a server, a video camera should be powered on, and the like.

In an embodiment, the process may also include accessing current state data for the appliances needed for the activity. In an embodiment, a remote control (or other device in an environment of appliances) tracks the state of various appliances which it controls. Tracking the state may be done in any suitable manner. For example, some appliances may provide state data to a remote control through a network or otherwise such as by transmitting signals to the remote control. As another example, the remote control may include or may receive data from various sensors that sense the state of the appliance. For example, if a television is on, various sensors may be used to detect light from a television in order to indicate that the television is on.

Similarly, the current state data may also be simulated. Simulated current state data may be data that is not sensed or explicitly provided to the remote control by the appliances, but that the remote control, or another device working in connection with the remote control, tracks itself. Simulated data may be maintained based in part on transmissions that may have been made by the remote control and/or user input to the remote control. For example, if a remote control transmits a power toggle command, the remote control (or a separate device monitoring transmissions from the remote control) may update current state data to toggle between power on and power off.

In an embodiment, the process may include generating a macro based at least in part on the activity, the content source, the end state data, and the current state data. Generating the macro may be performed by comparing current state data with end state data and determining whether commands should be transmitted to various appliances involved in the activity. The determination may be made, for example, dependent on whether the current state data for a particular appliance matches the end state data. As an illustrative example, if the current state data for an appliance indicates that the appliance is in a power off state, a determination may be made to issue a power on or power toggle command. As another example, if the current state data indicates that an appliance is set to an input mode that is different than indicated in the end state data, a determination may be made to issue one or more commands to cause the appliance to be in the proper input mode indicated by the end state data. Generally, any aspect of an appliance's state may be used to determine whether to transmit commands to one or more appliances. Once generated, the generated macro may then be executed, such as described above.

Various embodiments of the present disclosure also include techniques for intelligently updating a remote control according to how a user has used the remote control. In an embodiment, the process may include receiving user input such as described above. In some instances, receipt of the user input includes selection of a content source such as selection of content available from a video streaming service, music streaming service or a selection of a broadcast channel. The process may include detecting a selection of content source. Detection of a content source may be performed in any suitable manner. Detection of the content source may be, for example, performed upon selection of a channel that is programmed into the remote control as a favorite channel or, generally, any identifier of a source of content, where the source of content may be such as described above. Detection of the content source may also include more sophisticated processing. For example, detection of a content source may occur upon recording, by a remote control or device working in connection with a remote control, a series of numerical inputs and/or channel up/channel down inputs (and/or signal transmissions) followed by a long pause of inactivity (where a long pause may be predefined to be a pause exceeding a specified length of time). In this example, detection may be made of a content source corresponding to a broadcast channel. As yet another example, detection of the content source may be made upon recording user input indicative of an application launch and selection of an "OK" button followed by a long pause of inactivity, the long pause indicating user selection of a content source due to the lack of activity (e.g., because content is being provided and, therefore, there is less need for remote control activity). Detection may also take into account a lack of only certain activity following some recorded event. For example, referring to the examples above regarding numerical input, upon recording the numerical input, inactivity with respect to further numerical input (and/or channel up/down input and/or other specified types of input) may cause detection of the content source selection.

Upon detection of content selection, the process may include storing end state data for the content source. As noted above, a remote control or other device may track the state of various appliances. The state of the appliances may be recorded and, upon detection of the contents of the selection, the end state data may correspond to the current state data. Once end state data has been stored, macro data may be generated for the content source. Macro data may be, for example, such as described above (e.g., a macro or template for a macro). A UI control for selection of the content source may then be provided. For example, an icon representative of the content source may appear on the screen of a remote control. Providing the UI control may be dependent on further user input, such as input into the remote control by the user in response to a query to the user whether the UI control should be placed. Providing the UI control may also include placing the UI control in a portion of the GUI corresponding to recently accessed content sources. For instance, a location in the GUI, such as a dedicated screen, may be dedicated to recently accessed content sources and/or of recently accessed content sources of a certain type (e.g., broadcast TV channels). Similarly, a location in the GUI, such as a favorite channels list, a favorite contacts list, or generally some location designated for frequently accessed content may include one or more locations for content sources detected in connection with the process 1000 and/or variations thereof.

As noted, numerous variations are within the scope of the present disclosure. For example, numerous examples are given regarding remote controls in the traditional sense of the phrase, that is, devices that both accept user input and transmit signals to devices to control the devices. The techniques described and suggested herein are generally applicable to remote control systems, that is, collections of one or more devices that collectively operate to control sets of one or more appliances. As one example, embodiments of the present disclosure apply to remote control systems where a first device transmits signals to a second device that reactively transmits signals to the appliances, possibly using a different communications protocol, thereby acting as an intermediary between the first device and the appliance(s). The first device could be configured to have a primary purpose of transmitting such signals to the second device. As another example, the first device could be a smartphone and/or tablet computing device and/or other device with a remote control application. The first device, in this example, may transmit signals to the second device over a network, such as a local network within a home or other locale. In addition, a remote control system may include even more devices, each playing a role in the control of one or more appliances. Further, operations described above (e.g., analysis, state tracking, and other operations) may be performed by various devices in various remote control systems. For example, state tracking may be performed by a device different from a handheld controller, such as a device that monitors and/or is controlled by signals transmitted by the handheld controller.

Further, the description above discusses various interface features, such as buttons, icons, gestures, and the like. However, different types of input may be combined in different ways, as will be understood by those of skill in the art.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method for updating a control device, comprising:
   receiving identifying information about an appliance;
   receiving identifying information about a component of the appliance;
   sending a query to a remote server including information about the appliance and the component;
   receiving a response from the remote server including configuration information for the control device, the configuration information including a command for the appliance and a command that is specific to the component;
   mapping a first input of the control device to the command for the appliance;
   mapping a second input of the control device to the command that is specific to the component;
   receiving the second input; and
   in response to receiving the second input, sending the command that is specific to the component,
   wherein, the appliance is a lamp and the component is a light bulb.

2. The method of claim 1, further comprising storing state data about a state of the component on the control device, and updating the state data after sending the command that is specific to the component.

3. The method of claim 1, wherein the command for the appliance is mapped to at least one of a hard button, a soft button, or a touchscreen icon, and the command that is specific to the component is mapped to at least one of a hard button, a soft button, or a touchscreen icon.

4. The method of claim 1, wherein control device is at least one of a universal remote control, a smartphone, or a tablet computer.

5. The method of claim 1, further comprising associating in a memory of the control device another appliance that includes the same type of component with at least one of the command for the appliance or the command that is specific to the component.

6. The method of claim 1, further comprising displaying a query to the user regarding possible components that the appliance may include, wherein receiving the identifying information about the component of the appliance is received in response to the query.

7. The method of claim 1, wherein the response from the remote server includes commands that are adapted to match available controls of the control device.

8. The method of claim 1, wherein at least one of the command for the appliance or the command that is specific to the component is mapped to a specific control on the control device based at least in part on a user preference.

9. The method of claim 8, wherein the user preference is provided to the remote server, and content of the response from the remote server is based at least in part on the user preference.

10. A control device, comprising:
    a user interface;
    a wireless communication device;
    a processor; and
    a memory including computer-executable instructions that, when executed, configure the processor to:
      receive identifying information about an appliance;
      receive identifying information about a component of the appliance;
      send, via the wireless communication device, a query to a remote server including information about the appliance and the component;
      receive, via the wireless communication device, a response from the remote server including configuration information for the control device, the configuration information including a command for the appliance and a command that is specific to the component;
      map a first input of the control device to the command for the appliance;
      map a second input of the control device to the command that is specific to the component;
      receive the second input via the user interface;
      in response to receiving the second input, send the command that is specific to the component,
    wherein, the appliance is a lamp and the component is a light bulb.

11. The controller of claim 10, wherein the user interface includes at least one of a hard button, a soft button, a touch pad, and a touchscreen.

12. The controller of claim 10, further comprising instructions for storing state data about a state of the component on the control device, and updating the state data after sending the command that is specific to the component.

13. The controller of claim 10, wherein the command for the appliance is mapped to at least one of a hard button, a soft button, or a touchscreen icon, and the command that is specific to the component is mapped to at least one of a hard button, a soft button, or a touchscreen icon.

14. The controller of claim 10, wherein controller is at least one of a universal remote control, a smartphone, or a tablet computer.

15. The controller of claim 10, further comprising instructions for associating in the memory of the controller another appliance that includes the same type of component with at least one of the command for the appliance or the command that is specific to the component.

16. The controller of claim 10, further comprising instructions for displaying a query to a user regarding possible components that the appliance may include, wherein receiving the identifying information about the component of the appliance is received in response to the query.

17. The controller of claim 10, wherein at least one of the command for the appliance or the command that is specific to the component is mapped to a specific control on the control device based at least in part on a user preference.

18. The method of claim 17, wherein the user preference is provided to at least one of a local hub or the remote server.

19. A method for updating a control device, comprising:
receiving, at a server that is remote from the control device, identifying information about an appliance and identifying information about a component of the appliance;
obtaining information about a capability of the appliance;
obtaining information about the control device; and
sending a response from the server including configuration information for the control device, the configuration information including a command for the appliance and mapping instructions for the command that are based at least in part on the information about a capability of the appliance and the information about the control device,
wherein the appliance is a lamp and the component is a light bulb, and the configuration information includes a command that is tailored to the component.

20. The method of claim 19, further comprising:
obtaining information about a capability of the component,
wherein the configuration information includes a command that is tailored to the capability of the component.

21. The method of claim 19, wherein the command for the appliance is mapped to at least one of a hard button, a soft button, or a touchscreen icon, and the command that is tailored to the component is mapped to at least one of a hard button, a soft button, or a touchscreen icon.

22. The method of claim 19, wherein control device is at least one of a universal remote control, a smartphone, or a tablet computer.

23. The method of claim 19, wherein the server is configured to prepare responses to various control devices that have different controls, and the response from the server includes commands that are adapted to match available controls of the control device.

24. The method of claim 19, wherein at least one of the command for the appliance or the command that is tailored to the component is mapped to a specific control on the control device based at least in part on a user preference.

25. The method of claim 24, wherein the user preference is provided to the server, and content of the response from the server is based at least in part on the user preference.

26. The method of claim 19, wherein the configuration information includes a first mapping for the command for the appliance to a first input of the control device, and a second mapping for the command that is tailored to the component to a second input of the control device.

* * * * *